Feb. 9, 1937.   F. H. MOREHEAD   2,069,965
LUBRICATED VALVE
Filed Oct. 23, 1930
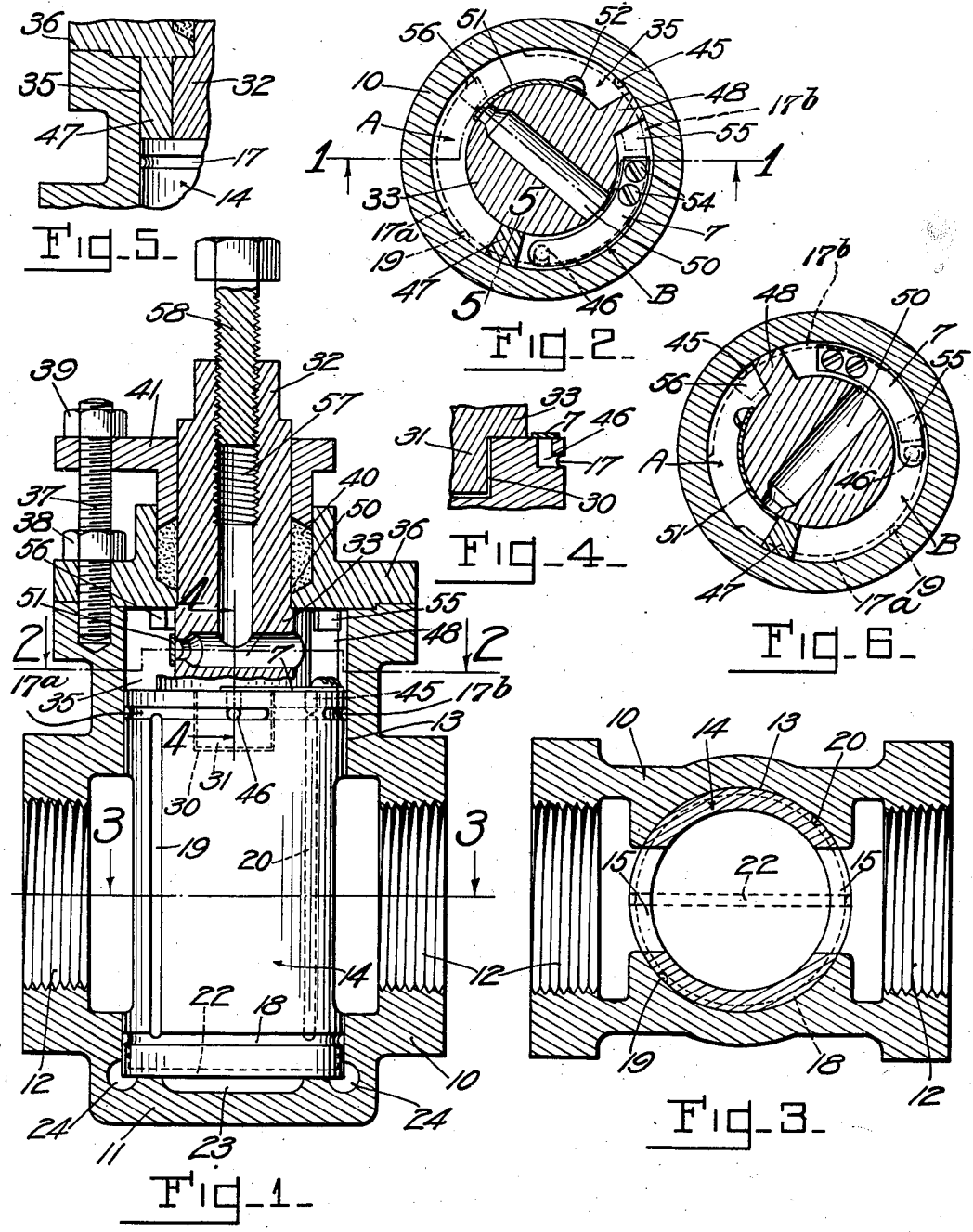
INVENTOR:
French H. Morehead
by Macleod, Calver, Copeland & Dike
Attys.

Patented Feb. 9, 1937

2,069,965

UNITED STATES PATENT OFFICE 2,069,965

LUBRICATED VALVE

French H. Morehead, Boston, Mass., assignor, by mesne assignments, to Walworth Patents, Inc., Boston, Mass., a corporation of Massachusetts Application October 23, 1930, Serial No. 490,615

11 Claims. (Cl. 251—93)

This invention relates to valves and more particularly to valves in which the seat is lubricated to prevent sticking of the valve.

It is an object of the invention to provide an efficient lubricated valve which is constructed so as to provide for a complete circulation of lubricant, such for example, that the lubricant may be circulated in a given direction in a continuous circuit and which may be arranged, if desired, to provide for an automatic circulation of lubricant when the valve is opened and closed.

These and other objects of the invention will be readily apparent from the following description in conjunction with the accompanying drawing: in which, Fig. 1 is a vertical section of a valve embodying the invention, the section being taken partially on the line 1—1 of Fig. 2.

Figs. 2, 3 and 4 are sectional views taken on the lines 2—2, 3—3, and 4—4, respectively, of Fig. 1.

Fig. 5 is a section taken on the line 5—5 of Fig. 2.

Fig. 6 is a view similar to Fig. 2 but showing the parts in a different position.

Before explaining in detail the present invention, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The valve embodying the invention as illustrated in the accompanying drawing comprises a substantially cup-shaped casing 10 and is provided with transverse openings 12. The interior of the casing 10 is provided with a seat 13 for a rotary valve member or plug 14 which is provided with apertures 15 which may be moved into and out of alinement with the openings 12 in the casing to open or close the valve. The surface of the plug 14 is provided with a circumferential groove 18 near the bottom with which longitudinal grooves 19 and 20 communicate. The plug surface is provided near the top with a circumferential groove 17a, extending partly around the plug and communicating with longitudinal groove 19, and with a circumferential groove 17b extending partly around the plug and communicating with longitudinal groove 20. The two grooves 17a and 17b are in the same transverse plane but are not continuous. The groove 18 is connected by a groove 22 with chambers 23 and 24 in the closed end 11 of the casing 10.

The top of the plug 14 is provided with a recess 30 adapted to receive loosely a socket member 31 projecting from the lower end of the valve stem 32. The lower portion of the stem 32 is provided with an enlargement 33 extending in spaced relation with respect to the inner wall of the casing 10 from the top of the plug 14 to substantially the plane of the top or open end of the casing 10 so as to provide a lubricant reservoir 35. The open end of the casing 10 is closed by an annular member or cap 36 which overlaps the enlargement 33. Packing 40 is interposed between the end of the cap 36 and the stem 32 and is held in place by a member 41 adjustably secured to the casing 10 by threaded rods 37 passing through member 41 and cap 36 and secured to the casing 10. Nuts 38 and 39 on the rods 37 are adapted for engagement with the cap 36 and member 41 respectively.

It will be apparent that when the cap member 36 is secured in position by means of the studs 37 and nuts 38, the stem 32 is held in position with the enlargement 33 engaging the plug 14 and the socket portion 31 in the recess 30. The parts are preferably arranged so that while relative longitudinal movement of the plug and stem is prevented yet relative transverse movement is possible. This construction prevents the stem from being unintentionally withdrawn and permits the plug to find its seat in the casing, even though the stem is not in true alignment therewith. Binding of the plug in its seat when the gland 41 is bolted down unevenly is also prevented.

It will further be apparent that the loose socket connection permits the pressure in the outlet line to force the plug 14 against the outlet side of the casing without strain on the stem and packing joint. Leakage from such constant strain is thereby prevented.

A groove 45 extending longitudinally in the surface of the plug 14 from the upper end thereof to the circumferential groove 17b forms a continuation of the groove 20 serves as an outlet for lubricant from the reservoir 35 and a hole 46 which extends from the groove 17a and terminates in the upper surface of the plug 14 serves as an inlet for lubricant to the reservoir 35. A partition is formed in the reservoir between the outlet 45 and the inlet 46 and as illustrated comprises an abutment 41 depending from the cap 36 between the inner surface of the casing 10 and the enlargement 33. The remaining portion of the partition is formed by a projection 48 extending longitudinally of and coextensive with the enlargement 33. The chambers A and B on opposite sides of the partition are connected by a transverse hole 50 in the enlargement 33. The end of the hole 50 adjacent the outlet chamber A is closed by a valve 51 which, as illustrated, may comprise an arc shaped spring leaf secured to the enlargement 33, as by screws 52. Similarly the inlet 46 is closed by a valve 7 which, as illustrated, may comprise a leaf spring secured to the upper surface of the plug 14, as by screws 54. Lugs 55 and 56 depend from the cap 36 and serve as stops limiting the open and closed positions of the valve respectively. Suitable means are provided for introducing lubricant into the lubricant circuit formed by the reservoir and the passages connected therewith. For this purpose a longitudinal hole 57 extends from the outer end of the stem 32 to the transverse hole 50. The hole 57 is threaded to receive a compression screw 58.

In the operation of the valve illustrated, lubricant is supplied to the reservoir 35 and its connected passages through the hole 57. The valve, as illustrated in Figs. 1 and 2, is in its open position and may be closed by turning the stem 32 counter-clockwise to bring the projection 48 into engagement with the stop 56 as illustrated in Fig. 6. In closing the valve, pressure is exerted upon the lubricant in the outlet chamber A, thus causing lubricant to pass through the outlet 45 and through the grooves 17b, 18, 20, and 22 and up through the grooves 19 and 17a and thence through the inlet 46 into the inlet chamber B, the valve 51 preventing the flow of lubricant through the hole 50 into the chamber B. When the valve is again opened by turning the stem 32 in a clockwise direction to bring the projection 48 into engagement with the stop 55, pressure is exerted upon the lubricant in the inlet chamber B, thus causing the lubricant to pass through the hole 50 into the outlet chamber A, the valve 53 preventing the flow of lubricant through the inlet 46. It will be noted that in this manner there is an automatic complete circulation of lubricant throughout a continuous circuit each time the valve is opened and closed thus preventing any quantity of the lubricant remaining stagnant in any part of the circuit and becoming hard.

Having thus described my invention, I claim:

1. In a valve, the combination of a casing having a passageway, an apertured plug in said casing adapted to be turned to open or close said passageway, a lubricant circuit comprising a reservoir and passages in the seating surface between the plug and casing having an inlet to and an outlet from said reservoir, means for supplying lubricant to said circuit, and means permitting the circulation of lubricant in one direction while preventing its circulation in the opposite direction.

2. In a valve, the combination of a casing having a passageway, an apertured plug in said casing adapted to be turned to open or close said passageway, a lubricant circuit comprising a reservoir and passages in the seating surface between said plug and casing having an inlet to and an outlet from said reservoir, means for supplying lubricant to said circuit, means permitting the circulation of lubricant in one direction while preventing its circulation in the opposite direction, and means for exerting pressure upon the lubricant to cause its circulation.

3. In a valve, the combination of a casing having a passageway, an apertured plug in said casing adapted to be turned to open or close said passageway, a lubricant circuit comprising a reservoir at one end of said plug and passages in the seating surface between said plug and casing having an inlet to and an outlet from said reservoir, a valve preventing the passage of lubricant from said reservoir through said inlet, a partition in said reservoir between said inlet and outlet, a valve controlled opening through said partition preventing the passage of lubricant through the partition towards said inlet, and means for causing lubricant to move through the opening in said partition towards said outlet.

4. In a valve, the combination of a casing having a passageway, an apertured plug in said casing adapted to be turned to open or close said passageway, a lubricant circuit comprising a reservoir at one end of said plug and passages in the seating surface between said plug and casing having an inlet to and an outlet from said reservoir, a valve preventing the passage of lubricant from said reservoir through said inlet, a partition in said reservoir between said inlet and outlet, a valve controlled opening through said partition preventing the passage of lubricant through the partition towards said inlet, and means for causing lubricant to move through said outlet and passages towards said inlet.

5. In a valve, the combination of a casing having a passageway, an apertured plug in said casing adapted to be turned to open or close said passageway, a lubricant circuit comprising a reservoir at one end of said plug and passages in the seating surface between said plug and casing having an inlet to and an outlet from said reservoir, a valve preventing the flow of lubricant from said reservoir through said inlet, a partition in said reservoir between said inlet and outlet, a valve in said opening through said partition preventing the flow of lubricant through the partition towards said inlet, said partition having a movable portion whereby movement in one direction causes flow of lubricant from said reservoir through said passages towards said inlet and movement in the other direction causes flow of lubricant through the opening in said partition towards said outlet.

6. In a valve, the combination of a casing having a passageway, an apertured plug in said casing adapted to be turned to open or close said passageway, a lubricant circuit comprising a reservoir at one end of said plug and passages in the seating surface between said plug and casing having an inlet to and an outlet from said reservoir, a valve preventing flow of lubricant from said reservoir through said inlet, a partition in said reservoir between said inlet and outlet, a valve in said opening through said partition preventing flow of lubricant through the partition towards said inlet, said partition having a portion movable with said plug whereby movement in one direction causes flow of lubricant from said reservoir through said passages towards said inlet and movement in the other direction causes flow of lubricant through the opening in said partition towards said outlet.

7. In a valve, the combination of a casing open at one end and closed at the other and having a transverse passageway, an apertured cylindrical plug in said casing adapted to be turned to open or close said passageway, a stem extending through the open end of said casing and having a socket connection with said plug, said stem having an enlargement thereon, said enlargement being spaced from said casing to provide a lubricant reservoir, a cap secured to the open end of said casing and overlapping said enlargement, passages in the seating surface between said plug and casing having an inlet to and an outlet from said reservoir and forming with the latter a lubricant circuit, a lubricant chamber between the plug and the closed end of said casing communicating with said passages, and a stuffing box between said cap and stem.

8. In a valve, the combination with a casing open at one end and closed at the other and having a transverse passageway, of a valve member adapted to control the flow of fluid through the passageway, said valve member comprising an apertured cylindrical plug seated in said casing and a stem extending through the open end of said casing and connected to said plug, a projecting portion on the open end of the casing engaging the stem and spaced from the adjacent end of the plug to provide a lubricant reservoir, longitudinal and circumferential grooves in the seating surface of the casing and plug having communication with said reservoir, means to force lubricant into said reservoir, and means to force said lubricant from the reservoir into the grooves during movement of the valve member.

9. In a valve, the combination with a casing open at one end and closed at the other and having a transverse passageway, of a valve member adapted to control the flow of fluid through the passageway, said valve member comprising an apertured cylindrical plug seated in said casing and a stem extending through the open end of said casing and connected to said plug, a projecting portion on the open end of the casing engaging the stem and spaced from the adjacent end of the plug to provide a lubricant reservoir, a pair of longitudinal grooves in the seating surface of the casing and plug, one of said grooves having direct communication with the reservoir at all positions of the valve member and the other longitudinal groove terminating short of direct communication therewith, means to effect communication between the reservoir and the short longitudinal groove, a continuous circumferential groove in said seating surface communicating with the longitudinal grooves to form a lubricant circuit, and pressure generating means operative during movement of the valve member to force lubricant from the reservoir into the circuit.

10. In a valve, the combination with a casing open at one end and closed at the other and having a transverse passageway, of a valve member adapted to control the flow of fluid through the passageway, said valve member comprising an apertured cylindrical plug seated in said casing and a stem extending through the open end of said casing and connected to said plug, a projecting portion on the open end of the casing engaging the stem and spaced from the adjacent end of the plug to provide a lubricant reservoir, a pair of longitudinal grooves in the seating surface of the casing and plug, one of said grooves having direct communication with the reservoir at all positions of the valve member and the other longitudinal groove terminating short of direct communication therewith, means to effect communication between the reservoir and the short longitudinal groove, a continuous circumferential groove on one side of the passageway communicating with the longitudinal grooves to form a lubricant circuit, and pressure generating means operative during movement of the valve member to force lubricant from the reservoir into the circuit.

11. In a valve, in combination, a casing having a transverse passageway, an apertured cylindrical plug in said casing movable to control the flow of fluid through said passageway, a stem extending through the casing and having a socket connection with said plug, an enlargement on said stem engaging the plug, said stem and plug being spaced from a portion of said casing to provide a lubricant reservoir, a cap portion on the casing engaging the stem beyond the enlargement, a stop member projecting from said stem and extending beyond the enlargement, a pair of abutments on the cap portion adapted to be engaged by the stop to limit rotation of said plug, passages in the seating surface of the plug and casing having communication with said reservoir and forming with the latter a lubricant circuit, a packing in said cap portion and engaging the stem, and a gland movable relatively to the cap portion for adjusting the packing.

FRENCH H. MOREHEAD.